United States Patent [19]
Yamamuro et al.

[11] Patent Number: 5,637,945
[45] Date of Patent: Jun. 10, 1997

[54] BRUSHLESS MOTOR

[75] Inventors: Kiyoshi Yamamuro; Hisahiro Miki; Kuniaki Hirayama, all of Ibaraki, Japan

[73] Assignee: Hitachi, Ltd., Tokyo, Japan

[21] Appl. No.: 124,189

[22] Filed: Sep. 21, 1993

[30] Foreign Application Priority Data

Sep. 22, 1992 [JP] Japan ................. 4-252505

[51] Int. Cl.⁶ ............ H02K 1/22; H02K 21/24; H02K 11/00
[52] U.S. Cl. ............ 310/268; 310/68 B; 310/68 R; 310/156; 310/DIG. 6
[58] Field of Search ............ 310/67 R, 68 R, 310/71, 68 B, 168, 171, 254, 268, DIG. 6, 156

[56] References Cited

U.S. PATENT DOCUMENTS

| | | | |
|---|---|---|---|
| 4,594,524 | 6/1986 | Sudo | 310/68 R |
| 4,668,884 | 5/1987 | Amao et al. | 310/68 R |
| 4,701,649 | 10/1987 | Maemine | 310/68 R |
| 4,701,650 | 10/1987 | Maemine | 310/268 |
| 4,801,830 | 1/1989 | Ogino et al. | 310/268 |
| 4,982,130 | 1/1991 | Cap et al. | 310/268 |
| 5,028,829 | 7/1991 | Cap et al. | 310/114 |
| 5,147,510 | 9/1992 | Iura et al. | 174/117 F |
| 5,245,235 | 9/1993 | Nagai et al. | 310/67 R |
| 5,252,876 | 10/1993 | Kawai et al. | 310/268 |
| 5,311,383 | 5/1994 | Yokouchi | 360/99.08 |

FOREIGN PATENT DOCUMENTS

| | | | |
|---|---|---|---|
| 55-153262 | 11/1980 | Japan | 310/71 |
| 2-269454 | 11/1990 | Japan | 310/254 |

*Primary Examiner*—Clayton E. LaBalle
*Attorney, Agent, or Firm*—Antonelli, Terry, Stout & Kraus, LLP

[57] ABSTRACT

A brushless motor includes a minimum number of parts and is assembled easily. A molded, substantially annular plastic permanent magnet on a rotor is magnetized in axially opposite directions alternatively such that a plurality of pairs of S and N poles are formed alternatively. The substantially annular permanent magnet includes an annular portion associated with air-core coils provided on a stator for generating a driving torque for the rotor and associated with a frequency signal generating circuit pattern provided on the stator for generating an electric signal indicative of a rotor speed and a protruded portion protruding from an outer peripheral side surface of the annular portion and associated with a rotor position detecting means provided on the stator for generating an electric signal indicative of a rotor position. A boundary line between an S and N pole of one of the plural pole pairs passes through the protruded portion. Lead portions for connecting terminals of the frequency signal generating circuit pattern to external circuits are formed such that they are overlapped to prevent degradation of frequency signal generator characteristics.

5 Claims, 3 Drawing Sheets

BRUSHLESS MOTOR

BACKGROUND OF THE INVENTION

The present invention relates to a brushless motor and, particularly, to a structure of a brushless motor which is suitable to drive a rotary drum of a video tape recorder.

Generally, a conventional brushless motor includes a driving portion for producing rotational torque to be used to drive a utilization, a frequency generator portion for producing an electric signal indicative of a rotational speed thereof and a pulse generator portion for producing an electric signal indicative of a position of a rotor thereof. Each of these portions of the brushless motor may be constituted with a permanent magnet and a coil, etc. A typical example of such brushless motor is disclosed in, for example, Japanese Patent Application Laid-open No. S63-93770.

In order to simplify a structure of such conventional brushless motor and hence to reduce a manufacturing cost thereof, various systems have been proposed. In one system such as disclosed in Japanese Utility Model Application Laid-open No. H1-180871, a single magnet is commonly used for both a driving portion and a frequency generator portion, so that the number of magnets is reduced by one. In another system, a connecting pattern of a driving coil of a driving portion and a connecting pattern of a coil of a frequency generator portion are arranged in a common plane. Therefore, a space economy is improved to some extent. In a further system such as disclosed in Japanese Utility Model Application Laid-open No. S62-185475, a single magnet is used commonly for both a frequency generator portion and a pulse generator portion, resulting in elimination of one magnet.

Unfortunately, however, it is still impossible to use a single magnet for generating driving torque, a frequency signal and a pulse signal, simultaneously.

SUMMARY OF THE INVENTION

An object of the present invention to reduce the number of parts constituting a brushless motor.

Another object of the present invention is to reduce the number of assembling steps of a brushless motor.

Another object of the present invention is to provide an inexpensive brushless motor.

A further object of the present invention is to provide a structure of a brushless motor by which a single magnet can he used to generate driving torque, a frequency signal indicative of a rotational speed of a rotor thereof and a pulse signal indicative of a position of the rotor.

According to the present invention, the above mentioned objects are achieved by a brushless motor comprising a rotor including a substantially annular permanent magnet having a radially outward protrusion and magnetized in an axial direction and a stator including a printed wiring board of magnetic material, on a surface of which a printed wiring pattern of a frequency generator portion is formed, air core coils fixed onto the surface of the printed wiring board through an insulating layer and a magnetism detecting element provided on the printed wiring board.

The permanent magnet may be a plastic magnet formed by molding a uniform mixture of binder of plastic material and powder of ferromagnetic material such as ferrite or rare-earth metal. The plastic permanent magnet is shaped to substantially an annular shape having an outward protrusion on an outer peripheral surface thereof and is magnetized alternatingly in axial direction. Driving torque and a frequency signal indicative of rotational speed of the rotor are generated by magnetic field formed by the annular portion of the magnet and a pulse signal indicative of position of the rotor is generated by magnetic field formed by the protrusion.

DETAILED DESCRIPTION OF THE PREFERRED EMBODIMENTS

FIGS. 1 to 6 show a brushless motor according to an embodiment of the present invention which is applied to a drum drive motor for driving a cylinder drum of a video tape recorder which includes a rotary drum portion 1 on which a plurality of magnetic heads 2 are mounted and a stationary drum portion 5.

Figure 1:
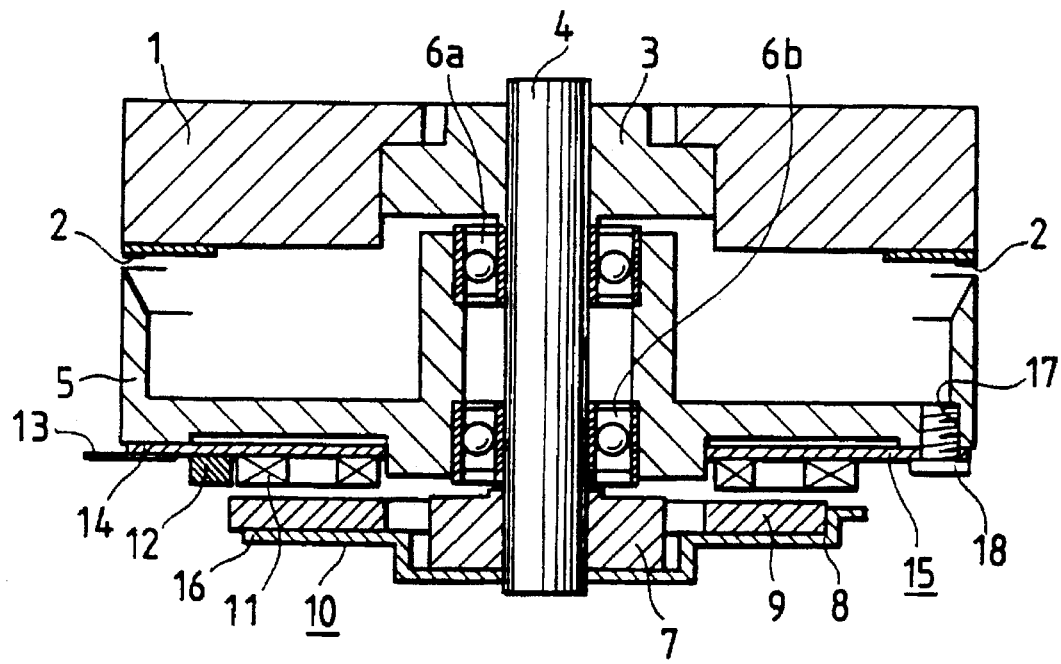
FIG. 1 is a vertical cross section of a brushless motor according to an embodiment of the present invention.

As shown in FIG. 1, the brushless motor is composed of an output shaft 4, a rotor 10 and a stator 15 fixedly mounted on a lower surface of the stationary drum portion 5 in opposing relation to the rotor 10. The stator 15 is adapted to mount a plurality of air-core coils 11 thereon.

The rotor 10 is composed of a generally dish-shaped case 8 of magnetic material, a boss 7 fixedly secured to a center portion of the case 8 and substantially an annular permanent magnet 9 fixedly secured to the dish-shaped case 8 so that it surrounds the boss 7. The case 8 has a recess 16 in a periphery thereof. The shaft 4 has a lower end fixedly secured suitably to the rotor 10 through the boss 7 and an upper portion rotatably supported by the stationary drum portion 5 through an upper bearing 6a and a lower bearing 6b. The rotary drum portion 1 is suitably fitted to the other, upper end of the shaft 4 through a rotary support 3 so that it can rotate with the rotor 10. A movement of the rotor 10 in axial direction, that is, thrust, is restricted with respect to the stator 15 by the boss 7.

Figure 2:
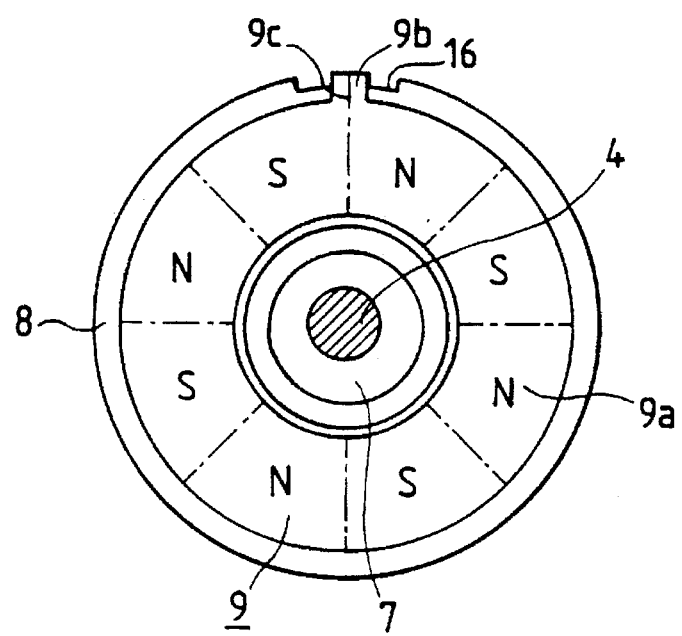
FIG. 2 shows a permanent magnet of a rotor of the brushless motor shown in FIG. 1.

FIG. 2 is a plan view of the permanent magnet 9 fixedly secured to the case 8. The generally annular permanent magnet 9 includes an annular portion 9a and a protrusion 9b protruding radially outwardly from an outer peripheral surface of the annular portion 9a. The permanent magnet 9 is prepared by molding a uniform mixture of fine powder of ferromagnetic material such as ferrite or rare-earth metal and plastic binder using any conventional molding technique.

The substantially annular permanent magnet 9 is magnetized in axial direction in such a way that there are alternative S and N poles formed so that a plurality of pairs of S and N poles (in FIG. 2, 4 pairs) are provided with a boundary line 9c between paired S and N poles of the annular portion 9a of the magnet 9 passing through the protrusion 9b as shown in FIG. 2. That is, the protrusion 9b has a pair of S and N poles. The protrusion 9b is positioned in the recess 16 so that a mass of the protrusion 9b is balanced therewith to thereby remove eccentricity of the rotor 10 due to presence of such protrusion. Of course, any other counter balance system may be employed if necessary.

Figure 3:
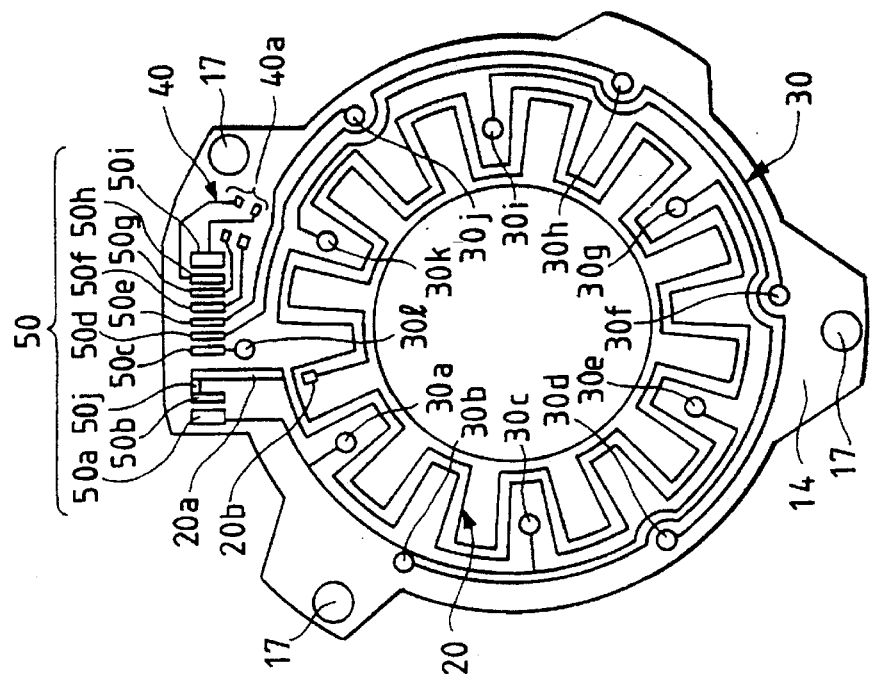
FIG. 3 is a plan view of a printed wiring board constituting a stator of the brushless motor shown in FIG. 1.

FIG. 3 is a plan view of the stator 15. In FIGS. 1 and 3, the stator 15 includes a printed wiring board 14 which is formed with a plurality of holes 17 for fixedly mounting it on the stationary drum portion 5 through screws 18.

The printed wiring board 14 is composed of a base plate of magnetic material, an insulating layer formed on one surface thereof and a copper foil formed on the insulating layer. By suitably etching the copper foil on the insulating layer formed on the magnetic base plate, a signal generator circuit 20 for generating a frequency signal as well as a pulse signal, a coil wiring pattern 30, a magnetic detector wiring pattern 40 and various terminal portions are formed as shown in FIG. 3.

The various terminal portions include a frequency signal generator circuit terminal portion including terminals 20a and 20b, an air-core coil terminal portion including terminals 30a to 30l, a detector terminal portion including terminals 40a and an external terminal portion including terminals 50a to 50i.

The terminal 20a of the frequency signal generator circuit pattern 20 is in the form of an elongated lead which is connected to the external terminal 50b through a lead wiring 50j and the terminal 20b of the frequency signal generator circuit pattern 20 is arranged on an extension line of the terminal 20a.

The terminals 30a, 30c and 30e of the wiring pattern 30 for the air-core coils 11 are commonly connected to the external terminal 50a and the terminals 30h, 30j and 30l are connected to the external terminals 50e, 50d and 50c, respectively, so that three branches each including two series connected air-core coils are star-connected, with the external terminal 50a being a neutral point.

The terminals 40a of the detector terminal portion are connected through the detector wiring pattern 40 to the external terminals 50f to 50i, respectively.

Figure 4:
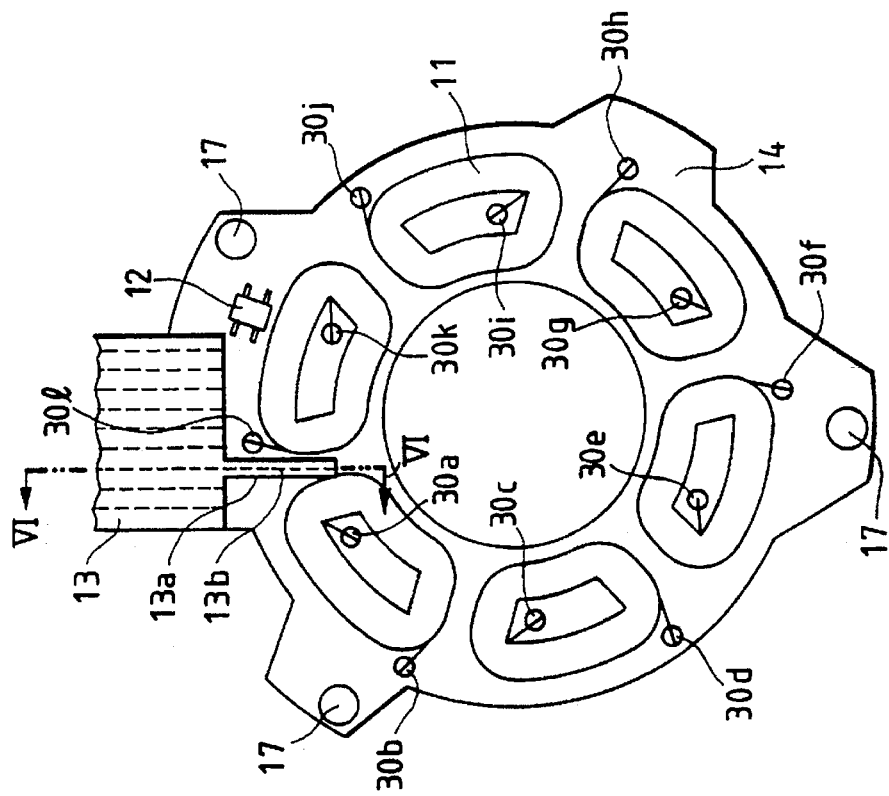
FIG. 4 shows an arrangement of air-core coils on the printed wiring board shown in FIG. 3.

FIG. 4 shows an arrangement of the air-core coils 11, the magnetic field detecting element 12 and a flexible printed circuit board 13 on the printed wiring board 14 shown in FIG. 3. In FIG. 4, the wiring patterns and the terminals patterns formed on the printed wiring board 14 are not shown for simplicity of illustration.

In FIG. 4, each air-core coil 11 is formed by winding a suitable known self-adhesive magnet wire by any known coil winder and solidifying it. The magnetic field detecting element 12 may be a Hall element which outputs a voltage signal corresponding to magnetic field strength or a magnetoresistive element whose resistance varies with variation of magnetic field. The flexible printed circuit board 13 is formed with a plurality of wiring lines shown by dotted lines which are arranged correspondingly to the various wiring patterns and the terminal patterns of the printed wiring board 14 for electrical connection of electric portions on the stator 15 of the brushless motor to external circuits. The air-core coils 11, the magnetic field detecting element 12 and the flexible printed circuit board 13 are fixedly mounted at predetermined locations on the printed wiring board 14, respectively, by bonding or soldering as shown in FIG. 4.

Figure 6:
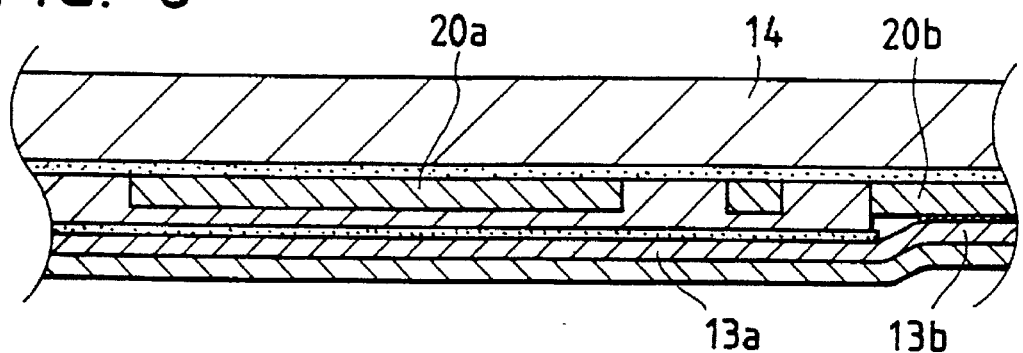
FIG. 6 is a schematic side view showing a positional relation between terminals of a frequency signal generating circuit pattern formed on the printed wiring board of a stator and a flexible printed circuit board for connecting various wiring patterns on the printed wiring board to external circuits.

The flexible printed circuit board 13 includes an extension 13a on which a copper foil 13b is formed for connection to the terminal 20b on the printed wiring board 14 shown in FIG. 3. Since electrical connection of the circuit pattern and the wiring patterns shown in FIG. 3 to external circuit or circuits through the flexible printed circuit board itself is well known, description of details thereof will be unnecessary. It should be noted, however, that the copper foil 13b on the extension 13a is overlapped on the terminal 20a through a suitable insulating layer formed thereon, as shown in FIG. 6 which is a cross section taken along a line VI—VI in FIG. 4.

In the brushless motor for driving the rotary drum constituted as mentioned above, a main magnetic circuit is formed through the case 8, the annular portion 9a of the magnet 9 and the printed wiring board 14. When the air-core coils 11 are disposed within a magnetic field generated by the magnet 9 between the printed wiring board 14 and the case 8 of the magnetic circuit and supplied with electric current through a known motor driving circuit (not shown), torque is generated with which the rotor 10 is driven.

The circuit pattern 20 on the printed wiring board 14 is also subjected to the main magnetic field, inducing voltage pulses therein the number of which depends upon both the number of magnetic poles of the annular portion 9a of the magnet 9 and a pitch angle of the circuit pattern 20. In the shown embodiment, the number of magnetic poles of the annular portion 9a of the magnet 9 is eight and the pitch angle is 15 degree. Therefore, the number of pulses generated per one revolution of the rotor 10 is twelve.

When this brushless motor is used in a video tape recorder of NTSC system in which a rotational speed of the rotary drum is 30 rps, an A.C. voltage of 360 Hz which is equal to the general characteristics standard of the video tape recorder is induced in the circuit pattern 20. Therefore, the voltage induced in the circuit pattern 20 can be used as an electric signal proportional to the rotational speed of the rotary drum 1. Although the doubled circuit pattern 20 shown in FIG. 3 is preferable to obtain a desired amplitude of induced voltage, it can be made single if the function of the video tape recorder is satisfied with a smaller voltage value.

Figure 5:
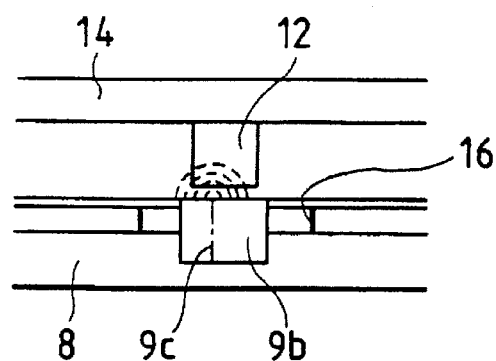
FIG. 5 is a side view of the rotor of the brushless motor, showing magnetic field generated by a protrusion of the permanent magnet mounted on the rotor.

The magnetic field generated from the protrusion 9b of the permanent magnet 9 is very localized and magnetic line of force thereof is closed across the boundary line 9c as shown in FIG. 5. Therefore, it does not affect the printed wiring board 14 substantially. Therefore, if any conventional circuit pattern for detecting a position of the rotor 10 were formed on the surface of the printed wiring board by etching the copper foil, a voltage obtainable thereby would be not enough to detect the rotor position. In this embodiment, instead of such circuit pattern, the position detecting element 12 such as Hall element is arranged on the printed wiring board 14 outside the magnetic field produced by the annular portion 9a of the magnet 9, so that it can generate an electric signal indicative of position of the rotor 10 by only the localized small magnetic field from the protrusion 9b.

Although the localized magnetic field does not affect the printed wiring board 14 substantially as mentioned, it may provide some "adverse effect" on the end terminal 20a of the circuit pattern 20. That is, since the level of A.C. voltage induced in the circuit pattern 20 by the magnetic field from the annular portion 9a of the magnet 9 may be lower than other signals including the position indicative signal obtainable by the magnetic field detecting element 12, frequency components of 30 Hz, 120 Hz and 330 Hz, etc., are superimposed on the frequency signal of 360 Hz from the circuit pattern 20, causing signal to noise ratio to be reduced. Since reduction of S/N ratio leads to degradation of the accuracy of speed control of the drum motor, such reduction of S/N ratio must be avoided.

As mentioned previously, according to the present invention, in order to solve this problem, the terminals 20a and 20b of the signal circuit 20 are arranged in alignment with the copper film 13b on the extension 13a of the flexible printed circuit board 13 and the terminal 20b is led out through the copper film 13b of the flexible printed circuit board 13 as shown in FIG. 6 so that a portion of the localized, closed magnetic field from the protrusion 9b of the permanent magnet 9 acting on the terminal 20a also acts on the terminal 20b in the same direction to cancel out the adverse effect.

Figure 7:
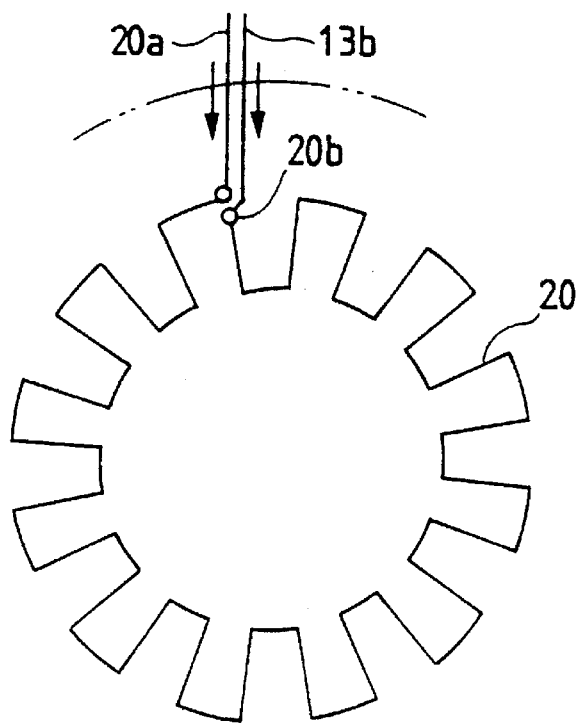
FIG. 7 illustrates an arrangement of the flexible printed circuit board with respect to the printed wiring board.

FIG. 7 illustrates this function. As shown in FIG. 7, the protrusion 9b of the rotor magnet 9 crosses the terminal 20a and the copper foil 13b overlapped thereon along a path shown by a chain line. Therefore, currents which are identical in value and direction are induced in the terminal 20a and the copper foil 13b by the magnetic field generated by the protrusion 9b of the magnet 9. Since these currents flow through the coil 20 in opposite directions, they are cancelled out effectively.

Although, instead of the copper foil 13b on the extension 13a of the flexible printed circuit board 13, any conductor to be overlapped on the terminal 20b may be provided separately, it is preferable to use a portion of the flexible printed circuit board therefor as in the embodiment in view of cost of parts, efficiency of assembling work, variation of effect, etc.

According to the brushless motor of the present invention in which the so-called plastic magnet in the form of annular ring having a protrusion on an outer side surface thereof is magnetized in axial direction such that a plurality of S and N poles are formed alternatively with one of boundary lines between S and N poles passes through the protrusion, a position detecting element for detecting position of the rotor is provided on the magnetic substrate of the stator and the terminals of the circuit pattern for signal generation is arranged such that they overlap on a portion of the flexible printed circuit board acting as the lead wire. Therefore, the number of parts and the number of assembling steps are reduced and hence the cost is reduced while providing a preferable characteristics.

What is claimed is:

1. A brushless motor comprising:
   a rotor including:
      a cylindrical case having a bottom and formed of magnetic material; and
      a substantially annular permanent magnet disposed on said bottom of said cylindrical case coaxially, said substantially annular permanent magnet including an annular portion and a protruded portion protruding radially outwardly from an outer peripheral side surface of said annular portion, said substantially annular permanent magnet being magnetized in only one kind of arrangement of magnetic poles in a manner such that a plurality of pole pairs each including an S magnetic pole and an N magnetic pole are formed in axially opposed directions alternatively; and
   a stator arranged in axially opposing relation to said rotor, said stator including:
      a substrate of magnetic material in the form of a base plate of a printed wiring board;
      an insulating layer formed on a surface of a first of two opposite sides of said substrate;
      a printed circuit pattern formed on said insulating layer of said printed wiring board in a region thereof corresponding to a region of said annular portion of said permanent magnet of said rotor for generating an electrical signal indicative of rotational speed of said rotor in conjunction with a magnetic field generated by said annular portion of said substantially annular permanent magnet;
      a plurality of air-core coils arranged on said printed circuit pattern in said region in opposing relation to said substantially annular permanent magnet for generating torque for driving said rotor in conjunction with the magnetic field generated by said annular portion of said magnet;
      a rotor position detecting means arranged on said first side of said substrate of said printed wiring board outside said region for generating an electric signal indicative of rotor position in conjunction with a magnetic field generated by said protruded portion of said substantially annular permanent magnet of said rotor;
      printed terminals and printed wiring patterns formed on said insulating layer of said printed wiring board, said printed wiring patterns connecting said printed circuit pattern, said aircore coils and said rotor position detecting means to said printed terminals, respectively; and
      a flexible printed circuit board arranged on said first side of said substrate of said printed wiring board for connecting said printed terminals on said printed wiring board to external circuits.

2. The brushless motor claimed in claim 1, wherein said rotor position detecting means comprises a magnetic field detecting element and said protruded portion of said substantially annular permanent magnet includes a pair of S and N poles.

3. A brushless motor comprising:
   a rotor including:
      a cylindrical case having a bottom and formed of magnetic material; and
      a substantially annular permanent magnet disposed on said bottom of said cylindrical case coaxially, said substantially annular permanent magnet including an annular portion and a protruded portion protruding radially outwardly from an outer peripheral side surface of said annular portion, said substantially annular permanent magnet being magnetized in axially opposite directions alternatively such that a plurality of pole pairs each including an S magnetic pole and an N magnetic pole are formed; and
   a stator arranged in opposing relation to said rotor, said stator including:
      a substrate of magnetic material in the form of a base plate of a printed wiring board;
      an insulating layer formed on a surface of a first of two opposite sides of said substrate;
      a printed circuit pattern formed on said insulating layer of said printed wiring board in a region thereof corresponding to a region of said annular portion of said permanent magnet of said rotor for generating an electrical signal indicative of rotational speed of said rotor in conjunction with a magnetic field generated by said annular portion of said substantially annular permanent magnet;
      a plurality of air-core coils arranged on said printed circuit pattern in said region in opposing relation to said substantially annular permanent magnet for generating torque for driving said rotor in conjunction with the magnetic field generated by said annular portion of said magnet;

rotor position detecting means arranged on said first side of said substrate of said printed wiring board outside said region for generating an electric signal indicative of rotor position in conjunction with a magnetic field generated by said protruded portion of said substantially annular permanent magnet of said rotor;

printed terminals and printed wiring patterns formed on said insulating layer of said printed wiring board, said printed wiring patterns connecting said printed circuit pattern, said aircore coils and said rotor position detecting means to said printed terminals, respectively;

a flexible printed circuit board arranged on said first side of said substrate of said printed wiring board for connecting said printed terminals on said printed wiring board to external circuits; and said brushless motor further comprising a first lead portion formed on said substrate and connected to one terminal of said printed circuit pattern and a second lead portion formed on said flexible printed circuit board and connected to the other terminal of said printed circuit pattern, said second lead portion on said flexible printed circuit board being overlapped in the axial direction with said first lead portion on said substrate to substantially cancel out effects of the magnetic field generated from said protruded portion of said substantially annular permanent magnet on said first lead portion and said second lead portion of said printed circuit pattern to thereby restrict undesired component of an electric signal obtained from said printed circuit pattern.

4. The brushless motor claimed in any one of claims 1 to 2, wherein said magnetic case has a recess in an outer peripheral portion thereof and said protruded portion of said substantially annular permanent magnet is positioned in said recess so that an eccentricity of said rotor to be caused by said protruded portion is compensated for.

5. The brushless motor claimed in claim 2, wherein said magnetic field detecting element comprises a Hall element.

* * * * *